(12) United States Patent  
Rawat et al.

(10) Patent No.: US 7,478,085 B2  
(45) Date of Patent: Jan. 13, 2009

(54) ABILITY FOR DEVELOPERS TO EASILY FIND OR EXTEND WELL KNOWN LOCATIONS ON A SYSTEM

(75) Inventors: Anshul Rawat, Kirkland, WA (US); Brian D. Wentz, Seattle, WA (US); Chris J. Guzak, Kirkland, WA (US); David G. De Vorchik, Seattle, WA (US); John E. Brezak, Woodinville, WA (US); Ming Zhu, Sammamish, WA (US); Mohammed A. Samji, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 22 days.

(21) Appl. No.: 11/096,871

(22) Filed: Apr. 1, 2005

(65) Prior Publication Data

US 2006/0242154 A1    Oct. 26, 2006

(51) Int. Cl.  
*G06F 17/30* (2006.01)

(52) U.S. Cl. ............... 707/4; 707/1; 707/100; 707/200

(58) Field of Classification Search ............ 707/1, 707/3, 4, 10, 102, 103 R, 200, 100; 345/789; 713/100; 715/513, 843; 719/315, 328, 325  
See application file for complete search history.

(56) References Cited

U.S. PATENT DOCUMENTS

| 5,771,381 | A | * | 6/1998 | Jones et al. | 713/100 |
| 5,886,699 | A | * | 3/1999 | Belfiore et al. | 715/843 |
| 6,061,695 | A | * | 5/2000 | Slivka et al. | 715/513 |
| 6,360,280 | B1 | * | 3/2002 | Jones | 719/328 |
| 6,915,299 | B1 | * | 7/2005 | Arcuri et al. | 707/100 |
| 2004/0165008 | A1 | * | 8/2004 | Levine et al. | 345/789 |

OTHER PUBLICATIONS

Microsoft, Windows Logo Programs, Jan. 2, 2002, Version 2.3, pp. 1-98.*

* cited by examiner

*Primary Examiner*—Pierre M Vital  
*Assistant Examiner*—Fred I Ehichioya  
(74) *Attorney, Agent, or Firm*—Shook, Hardy & Bacon L.L.P.

(57) ABSTRACT

A method and data structure for creating and accessing folders stored in well known locations. The data structure and method utilizes a set of APIs to create and manage well known folders on a system and/or to locate specific well known folders. The invention provides interfaces to create, locate, extend, and enumerate well known folders. In addition, the invention allows a developer and/or user to customize properties of well known folders.

20 Claims, 13 Drawing Sheets

```
HRESULT SHGetFolderLocationEx(REFKNOWNFOLDERID rfid,    ─1401
                              DWORD dwFlags, ── 1402
                              HANDLE hToken, ──1403
                              __out PIDLIST_ABSOLUTE *ppidl);

```
HRESULT SHGetFolderPathEx    (REFKNOWNFOLDERID rfid,    ─1401
                              DWORD dwFlags, ────1402
                              HANDLE hToken, ──── 1403
                              __out_ecount(cchPath) LPWSTR pszPath,
                              int cchPath);
         1500                                              1508
                                        1509
```

FIGURE 15

```
                                                          1401
HRESULT SHSetFolderPathEx    (REFKNOWNFOLDERID rfid,
                              DWORD dwFlags, ── 1402
                              HANDLE hToken, ── 1403
                              __in_opt LPCTSTR pszPath);

```
interface IKnownFolder : IUnknown
{
1701 —— HRESULT GetId([out] KNOWNFOLDERID *pkfid);

1702 —— HRESULT GetCategory([out] KF_Category *pCategory);

1703 —— HRESULT GetPath([in] DWORD dwFlags, [out, size_is(cchPath)] LPWSTR pszPath,
         [in] int cchPath);

1704 —— HRESULT SetPath([in] DWORD dwFlags, [in, string] LPCWSTR pszPath);

1705 —— HRESULT GetLocation([in] DWORD dwFlags, [out] PIDLIST_ABSOLUTE *ppidl);

1706 —— HRESULT GetItem([in] REFIID iid, [out] void *ppv);

1707 —— HRESULT IsRedirectable();

1708 —— HRESULT IsValidFolderPath([in, string] LPCWSTR pszNewPath);

1709 —— HRESULT Redirect([in] KF_REDIRECTOR_FLAGS flags, [in, string] LPCWSTR pszPath);

1710 —— [local] HRESULT RedirectWithUI([in] HWND hwnd, [in] KF_REDIRECT_FLAGS
         flags, [in, string] LPCWSTR pszPath);
}
```

```
interface IKnownFolderManager : IUnknown
{
```
1801 — HRESULT FolderIdFromCsidl([in] int nCsidl, [out] KNOWNFOLDERID *pfid);
1802 — HRESULT FolderIdToCsidl([in] REFKNOWNFOLDERID rfid, [out] int *pnCsidl);
1803 — HRESULT GetFolder([in] REFKNOWNFOLDERID rfid, [out] IKnownFolder **ppkf);
1804 — [local] HRESULT GetFolderForUser([in] REFKNOWNFOLDERID rfid, [in] HANDLE hToken,
       [out] IKnownFolder **ppkf);
1805 — HRESULT GetFolderDefinition([in] REFKNOWNFOLDERID rfid,
       [out] KNOWNFOLDER_DEFINITION *pKFD);
1806 — HRESULT RegisterFolder([in] REFKNOWNFOLDERID rfid,
       [in] const KNOWNFOLDER_DEFINITION *pKFD);
1807 — HRESULT UnregisterFolder([in] REFKNOWNFOLDERID rfid);
1810 — [local] HRESULT GetEnumKnownFoldersForUser([in] HANDLE hToken,
       [out] IEnumKnownFolders **ppekf);
1809 — HRESULT GetEnumKnownFolders([out] IEnumKnownFolders **ppekf);
1811 — HRESULT FindFolderFromPath([in] LPCWSTR pszPath, [out] IKnownFolder **ppkf);
```
}
```
1800
FIGURE 18

```
typedef struct tagKNOWNFOLDER_DEFINITION
{
    KF_CATEGORY Category;       —1910
    LPWSTR pszName;             —1911
    LPWSTR pszCreator;          —1912
    LPWSTR pszDescription;      —1913
    KNOWNFOLDERID fidParent;    —1914
    LPWSTR pszRelativePath;     —1915
    LPWSTR pszParsingName;      —1916
    LPWSTR pszTooltip;          —1917
    LPWSTR pszLocalizedName;    —1918
    LPWSTR pszIcon;             —1919
    LPWSTR pszSecurity;         —1920
    DWORD dwAttributes;         —1921
    LPWSTR pszLegacyPath;       —1922
    CLSID clsidHandler;         —1923
    KF_DEFINITION_FLAGS kfdFlags; —1924
}
```
1900
FIGURE 19

```
interface IEnumKnownFolder : IUnknown
    {
2001 — HRESULT Next([in] ULONG celt,
                   [out, size_is(celt), length_is(*pceltFetched)] IKnownFolder** rgelt,
                   [out] ULONG* pceltFetched);

2002 — HRESULT Skip([in] ULONG celt);

2003 — HRESULT Reset();

2004 — HRESULT Clone([in] IEnumKnownFolder** ppEnumFolders);
    }
```

```
interface IKnownFolderHandler : IUnknown
    {
2101 — HRESULT GetDefaultLocation([out, size_is(cchBuffer)]
                                 LPWSTR pszBuffer,
                                 [in] int cchBuffer);

2102 — HRESULT FolderCreated([in] REFKNOWNFOLDERID rfid,
                            [in] DWORD dwFlags,
                            [in] LPCWSTR pszPath);

2103 — HRESULT FolderRemoved([in] REFKNOWNFOLDERID rfid,
                            [in] DWORD dwFlags,
                            [in] LPCWSTR pszPath);
    }
```

ABILITY FOR DEVELOPERS TO EASILY FIND OR EXTEND WELL KNOWN LOCATIONS ON A SYSTEM

FIELD OF THE INVENTION

The invention generally relates to creating and managing folders stored in well known locations with a set of application programming interfaces.

BACKGROUND OF THE INVENTION

Today developers and users typically store data from various applications in certain well known folders such as the My Documents folder or the My Pictures folder. These well known folders provide easy access across multiple applications and computer network environments in order for developers and users to access information. These well known folders are utilized in operating systems, such as Windows® brand Operating Systems.

For example, many applications utilize specific well known folders such as the My Documents folder for storing data applicable to the particular application being installed. The use of the My Documents folder enables other applications the ability to access the stored information. For instance a jpeg file may be used by several photo publishing applications. A particular photo publishing application may store the jpeg file in a well known folder such as the My Documents folder so that other photo publishing applications may access the jpeg file. However, placement of numerous application files and folders under the My Documents folder creates an unorganized list of folders making searching for particular folders and data cumbersome and time consuming.

Existing operating systems such as Microsoft® Windows® utilize a Shell to organize data objects such as folders and files into a hierarchical namespace structure through a user interface or an application. The Shell may contain special folders whose location and existence may be known to the system and access to which is provided from numerous places in the Shell such as the Start Menu. The Shell may provide a set of SHFolderPath APIs to manage these well known folders for developers and users. The SHFolderPath APIs may utilize a fixed set of CSIDLs. The CSIDLs comprise ordinal values used to identify folders and provide a unique system-independent way to identify special folders used frequently by applications. A table is utilized to map the CSIDLs with the location of the well known folders on a disk or drive. In current versions of existing operating systems, such as Microsoft® Windows® XP, known folders are not extendable as the CSIDLs are not extendable. Moreover, the addition of new properties to existing known folders in existing operating systems is not possible.

Thus, it would be an advancement in the art to provide a method and data structure in which developers and users may create their own known folders for use by various applications. Additionally, it would be an advancement to add new or custom properties to existing as well as new known folders which may be utilized by developers or users. These custom properties may, for example, inform developers or users of a known folders intended usage. Furthermore, the method and data structure should enable a user to discover and utilize other known folders created by various applications which may be located on the same computer or on a network with a minimal amount of effort.

BRIEF SUMMARY OF THE INVENTION

The inventive method and data structure overcome the problems of the prior art by providing a set of APIs to enumerate well known locations on a system and/or to locate specific well known locations. In particular, the invention provides the functionally to locate, extend, and enumerate well known folders. In addition, the invention allows a developer and/or user to customize properties of well known folders.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 14 illustrates an extended API that may provide functionality such as retrieving a Knownfolder PIDL for the specified KnownFolderID in accordance with an aspect of the invention.

FIG. 15 illustrates an additional extended API that may provide functionality such as providing a caller with the actual file system path of a Knownfolder in accordance with an aspect of the invention.

FIG. 16 illustrates a third extended API that may provide functionality such as allowing a caller to set the path for a given known folder in accordance with an aspect of the invention.

FIG. 17 illustrates an IKnownFolder API that may provide functionality such as granting an application the ability to get the GUID value and/or a PIDL value for a defined knownfolder in accordance with an aspect of the invention.

FIG. 18 illustrates an IKnownFolderManager API that may provide the ability to create or delete a knownfolder in accordance with an aspect of the invention.

FIG. 19 illustrates the KnownFolder_Definition structure in accordance with an aspect of the invention.

FIG. 20 illustrates an IEnumKnownFolder( ) API that may provide the ability to enumerate knownfolders in accordance with an aspect of the invention FIG. 21 illustrates an IKnownFolderHandler( ) API that may provide the ability for other components to add special code for the creation and/or deletion of a knownfolder in accordance with an aspect of the invention.

DETAILED DESCRIPTION OF THE INVENTION

In order to clarify the disclosure of the invention, definitions of several relevant terms are provided herein.

Profile: Provides operating system and applications with a per-user location to store user specific data and settings.

Known Folder/KnownFolder: A category of folders which are made known to the Windows Shell and other components and applications.

SHFolderPath( ) APIs: A set of Shell folder APIs which include SHGetFolderLocation( ), SHGetFolderPath( ), and SHSetFolderPath( ).

CSIDLs Ordinal values used to identify folders and provide a unique system-independent way to identify special folders used frequently by applications.

Figure 1:
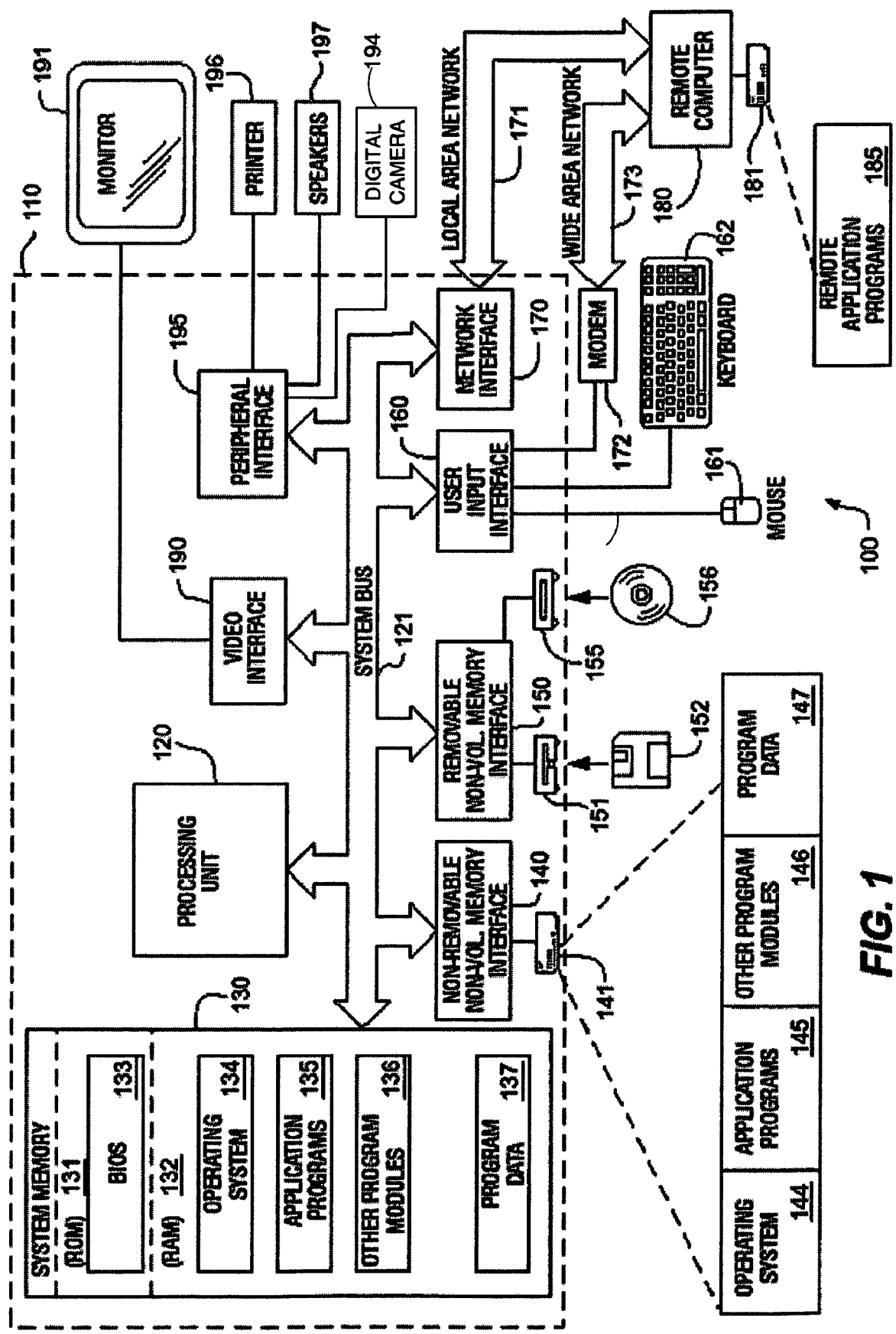
FIG. 1 illustrates an example of a suitable computing system environment on which the invention may be implemented.

FIG. 1 illustrates an example of a suitable computing system environment 100 on which the invention may be implemented. Computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and wireless pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. A peripheral interface 195 may interface to a video input device such as a scanner (not shown) or a digital camera 194, where output peripheral interface may support a standardized interface, including a universal serial bus (USB) interface.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 2:
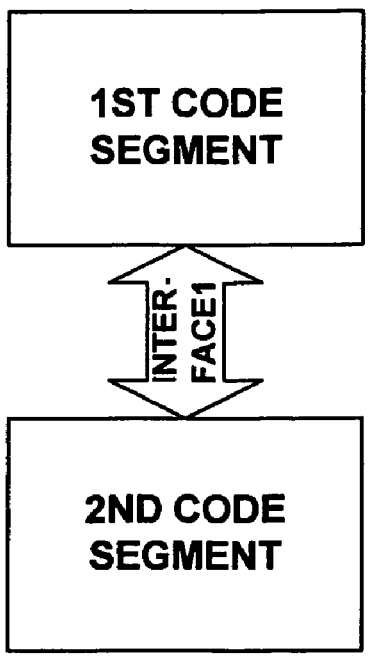
FIG. 2 illustrates an interface as a conduit through which first and second code segments communicate.
Figure 3:
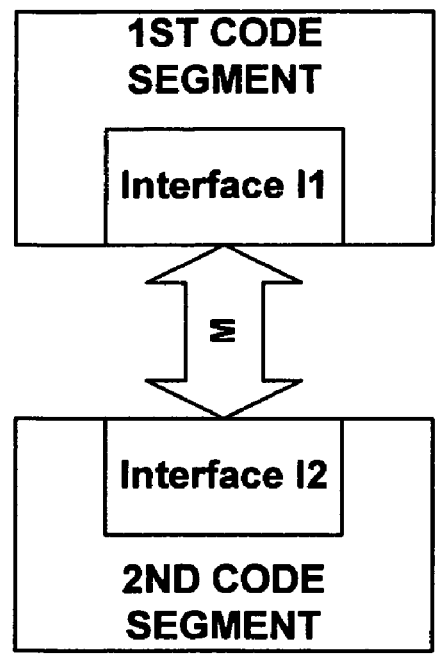
FIG. 3 illustrates an interface as comprising interface objects.

Notionally, a programming interface may be viewed generically, as shown in FIG. 2 or FIG. 3. FIG. 2 illustrates an interface Interface1 as a conduit through which first and second code segments communicate. FIG. 3 illustrates an interface as comprising interface objects I1 and I2 (which may or may not be part of the first and second code segments), which enable first and second code segments of a system to communicate via medium M. In the view of FIG. 3, one may consider interface objects I1 and I2 as separate interfaces of the same system and one may also consider that objects I1 and I2 plus medium M comprise the interface. Although FIGS. 2 and 3 show bidirectional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 2 and 3, but they nonetheless perform a similar function to accomplish the same overall result. We will now briefly describe some illustrative alternative implementations of a programming interface.

Figure 4:
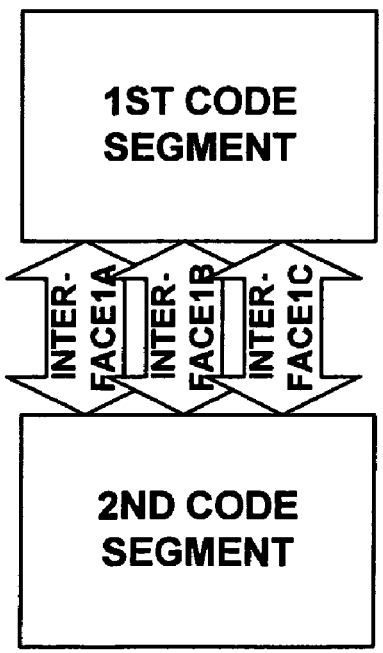
FIG. 4 illustrates a function provided by an interface that may be subdivided to convert communications of the interface into multiple interfaces.
Figure 5:
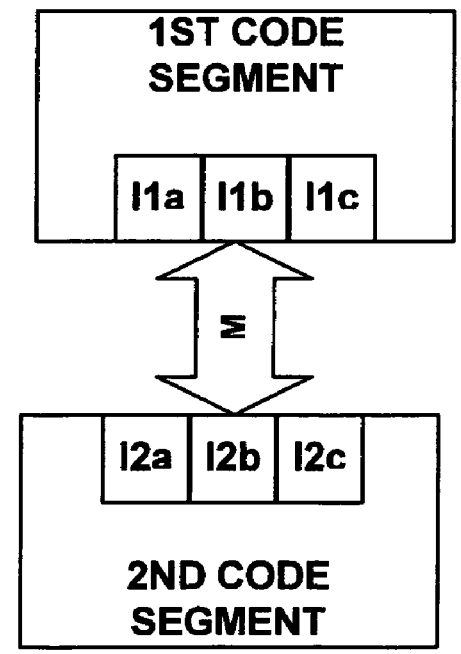
FIG. 5 illustrates a function provided by an interface that may be subdivided into multiple interfaces.

A communication from one code segment to another may be accomplished indirectly by breaking the communication into multiple discrete communications. This is depicted schematically in FIGS. 4 and 19. As shown, some interfaces can be described in terms of divisible sets of functionality. Thus, the interface functionality of FIGS. 2 and 3 may be factored to achieve the same result, just as one may mathematically provide 24, or 2 times 2 times 3 times 2. Accordingly, as illustrated in FIG. 18, the function provided by interface Interface1 may be subdivided to convert the communications of the interface into multiple interfaces Interface1A, Interface 1B, Interface 1C, etc. while achieving the same result. As illustrated in FIG. 5, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the $1^{st}$ code segment need not match the number of interfaces included with the $2^{nd}$ code segment. In either of the cases of FIGS. 4 and 5, the functional spirit of interfaces Interface1 and I1 remain the same as with FIGS. 2 and 3, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

Figure 6:
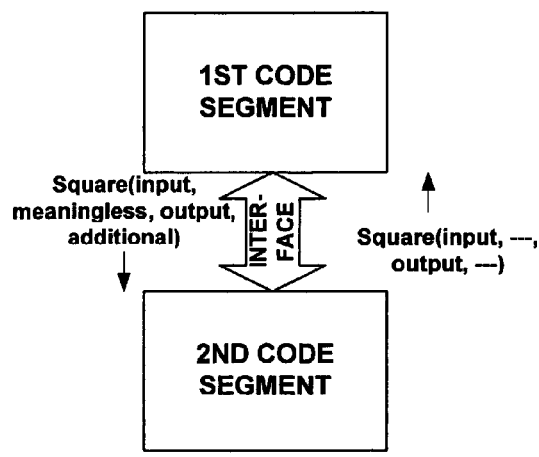
FIG. 6 illustrates an example of ignoring, adding, or redefining aspects of a programming interface while still accomplishing the same result.
Figure 7:
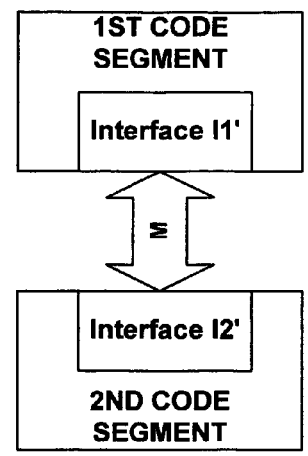
FIG. 7 illustrates another example of ignoring, adding, or redefining aspects of a programming interface while still accomplishing the same result.

In some cases, it may be possible to ignore, add or redefine certain aspects (e.g., parameters) of a programming interface while still accomplishing the intended result. This is illustrated in FIGS. 6 and 7. For example, assume interface Interface1 of FIG. 2 includes a function call Square(input, precision, output), a call that includes three parameters, input, precision and output, and which is issued from the $1^{st}$ Code Segment to the $2^{nd}$ Code Segment. If the middle parameter precision is of no concern in a given scenario, as shown in FIG. 6, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 7, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

Figure 8:
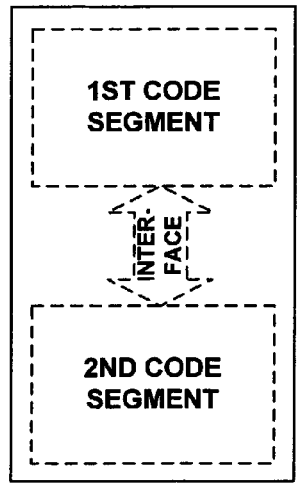
FIG. 8 illustrates merging code segments in relation to the example that is shown in FIG. 2.
Figure 9:
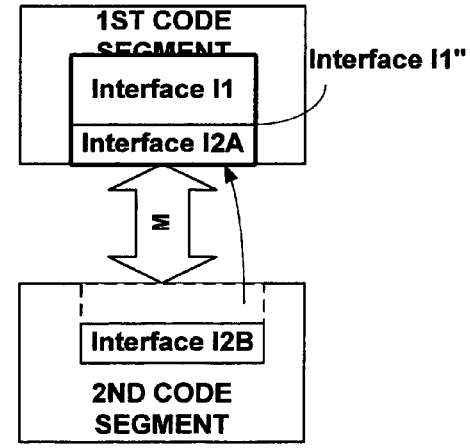
FIG. 9 illustrates merging interfaces in relation to the example that is shown in FIG. 3.

It may also be feasible to merge some or all of the functionality of two separate code modules such that the "interface" between them changes form. For example, the functionality of FIGS. 2 and 3 may be converted to the functionality of FIGS. 8 and 9, respectively. In FIG. 8, the previous $1^{st}$ and $2^{nd}$ Code Segments of FIG. 2 are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 9, part (or all) of interface I2 from FIG. 3 may be written inline into interface I1 to form interface I1". As illustrated, interface I2 is divided into I2$a$ and I2$b$, and interface portion I2$a$ has been coded in-line with interface I1 to form interface I1". For a concrete example, consider that the interface I1 from FIG. 3 performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

Figure 11:
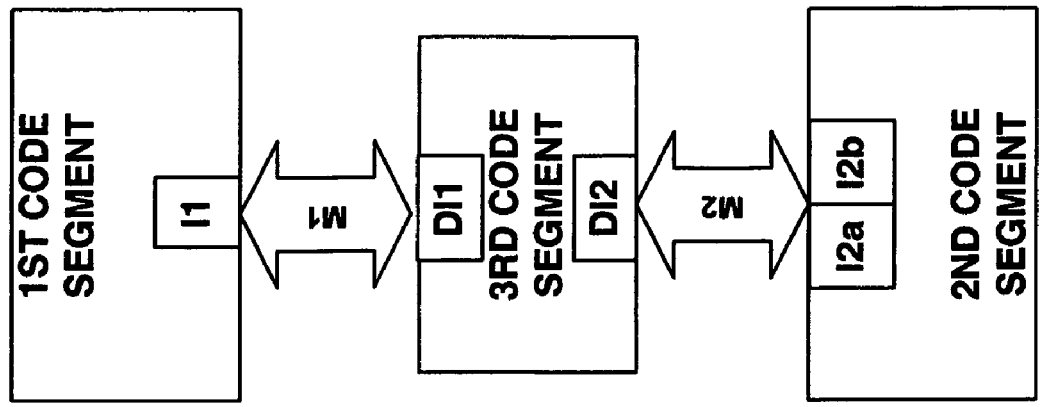
FIG. 11 illustrates a code segment that is associated with a divorce interface.
Figure 10:
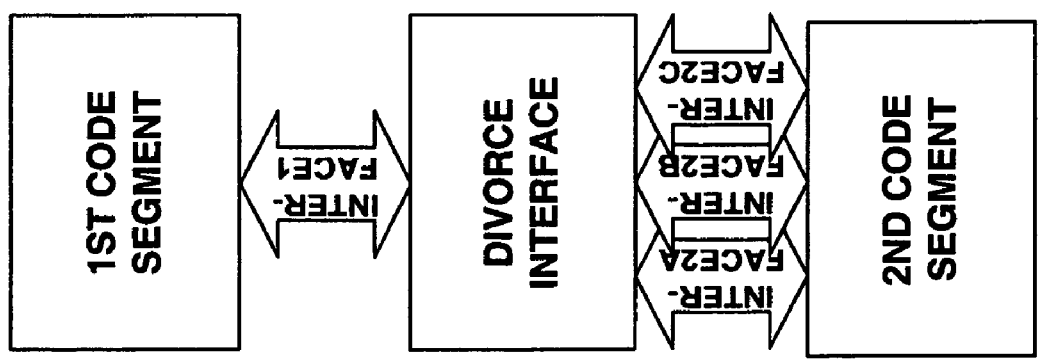
FIG. 10 illustrates middleware that converts communications to conform to a different interface.

A communication from one code segment to another may be accomplished indirectly by breaking the communication into multiple discrete communications. This is depicted schematically in FIGS. 10 and 11. As shown in FIG. 10, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 11, a third code segment can be introduced with divorce interface DI1 to receive the communications from interface I1 and with divorce interface DI2 to transmit the interface functionality to, for example, interfaces I2$a$ and I2$b$, redesigned to work with DI2, but to provide the same functional result. Similarly, DI1 and DI2 may work together to translate the functionality of interfaces I1 and I2 of FIG. 3 to a new operating system, while providing the same or similar functional result.

Figure 12:
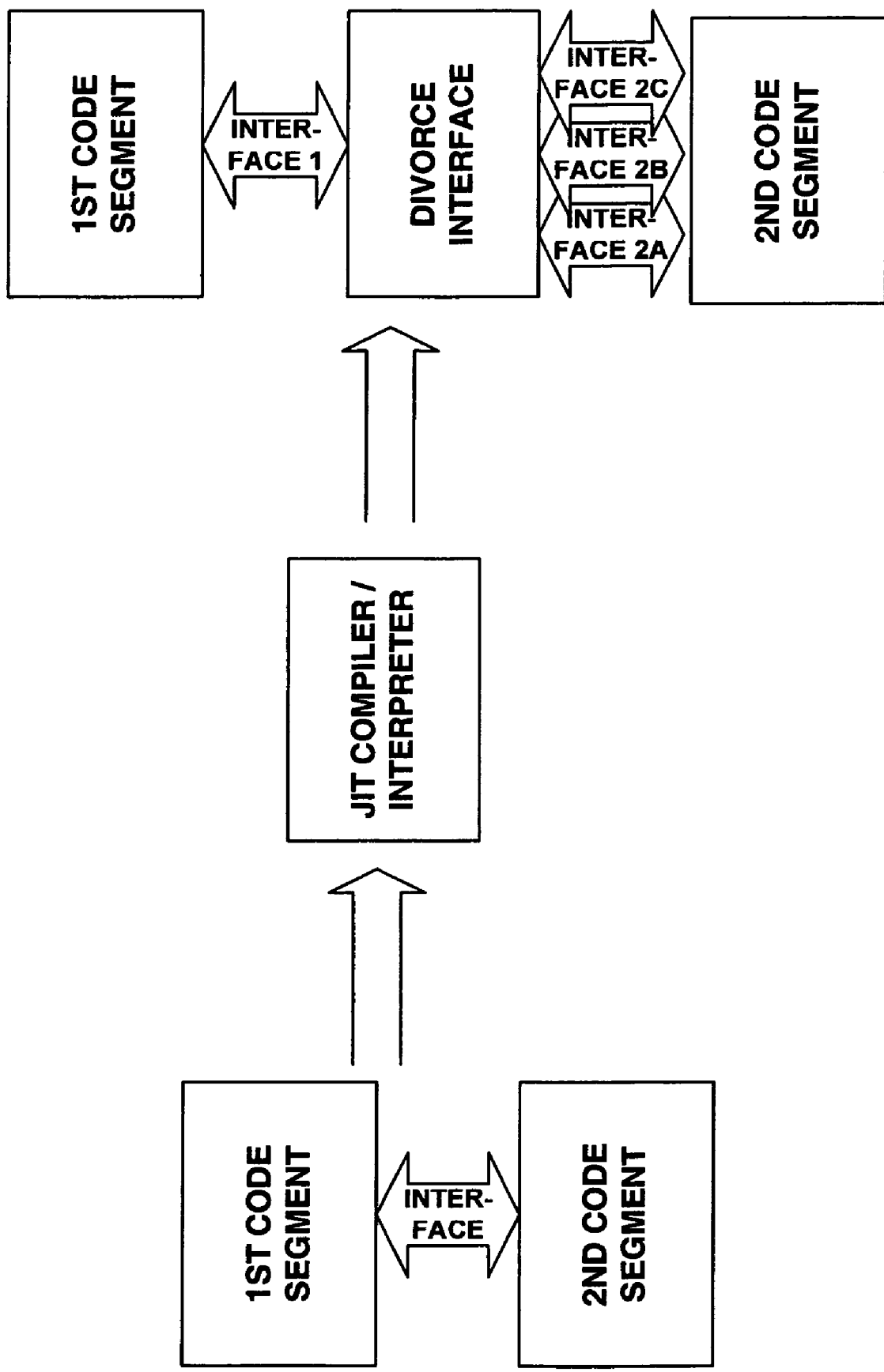
FIG. 12 illustrates an example in which an installed base of applications is designed to communicate with an operating system in accordance with an interface protocol, in which the operating system is changed to use a different interface.
Figure 13:
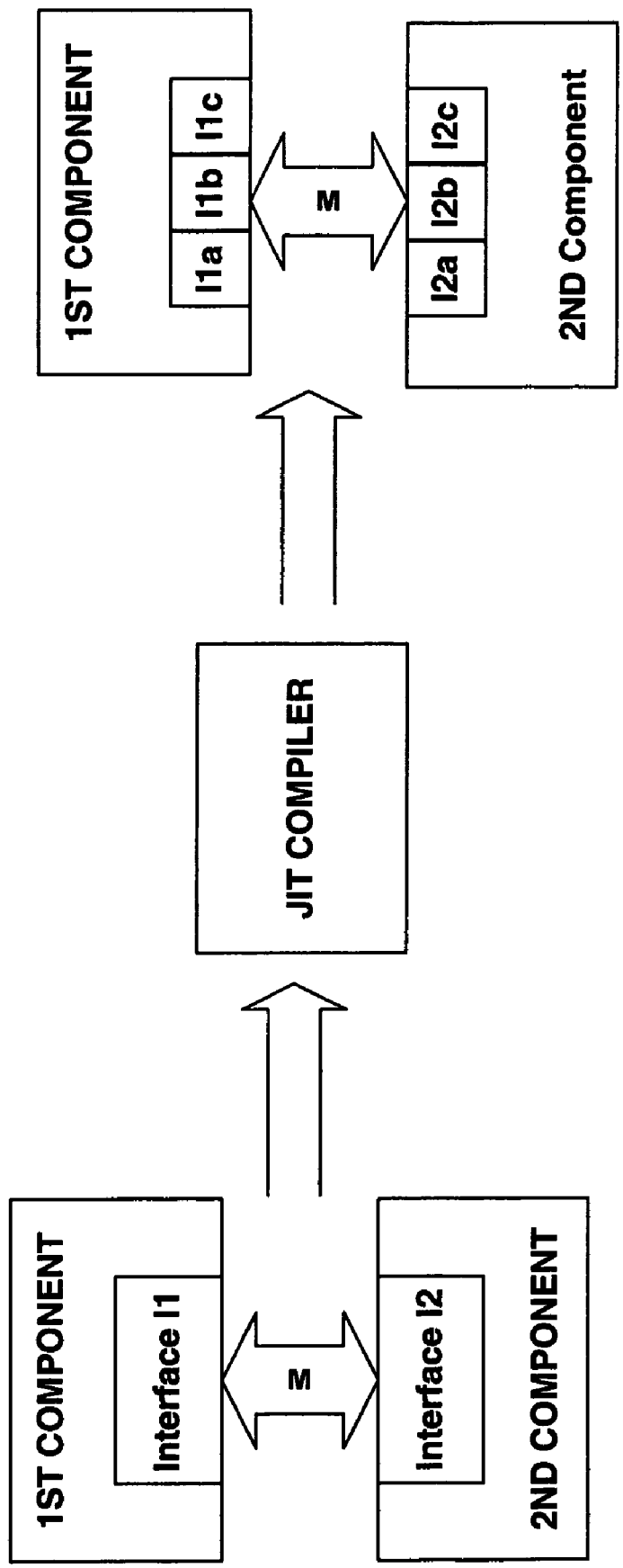
FIG. 13 illustrates rewriting interfaces to dynamically factor or otherwise alter the interfaces.

Yet another possible variant is to dynamically rewrite the code to replace the interface functionality with something else but which achieves the same overall result. For example, there may be a system in which a code segment presented in an intermediate language (e.g Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 12 and 13. As can be seen in FIG. 12, this approach is similar to the Divorce scenario described above. It might be done, e.g., where an installed base of applications are designed to communicate with an operating system in accordance with an Interface 1 protocol, but then the operating system is changed to use a different interface. The JIT Compiler could be used to conform the communications on the fly from the installed-base applications to the new interface of the operating system. As depicted in FIG. 13, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 2 and 3. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

A user interface gives users access to objects necessary for running applications and managing the operating system. These objects may include folders and files that may reside on a computer's disk drives. A Shell organizes these objects into a hierarchical namespace structure through the user interface or through an application. The Shell may contain special folders whose location and existence may be known to the system and access to which is provided from numerous places in the Shell such as the Start Menu.

In an aspect of the invention, a GUID (globally unique identifier) may be utilized to specify each individual known folder on a system. The known folders may belong to one of four categories which include virtual folders, fixed file-system folders, common folders, and per-user folders.

The virtual folders may be virtual shell folders which appear in the shell namespace and may not have any actual file system folders associated with them. For example, the Control Panel Folder and the Printer folders may be virtual folders which are not backed up by any actual file system folders but only exist in the shell virtual namespace. The fixed file folder may be file system folders that are not managed by the Shell and whose location is fixed when the system is installed. For example, the "Windows" folder and the "Program Files" folders are fixed folders. The common folders may be file system folders that may be used for sharing data and settings between users. For example, all users of a machine may share a common desktop folder. Finally, the per-user folders may be file system folders which are located under an individual's profile and owned by the individual user. For example, the "%USERPROFILE%\Pictures" is a folder for the current user's pictures.

In an aspect of the invention, the knownfolder functionality may be provided for both Win32 and Corn APIs. The Win32 APIs may provide backwards compatibility with the SHFolderPath APIs. The SHFolderPath APIs may be wrappers of the Com APIs with a hard coded mapping list of CSIDL to the new FOLDERIDs for those respective folders.

To support backwards compatibility, the knownfolder interface may support three Win32 API calls which include the SHGetFolderLocationEx( ), SHGetFolderPathEx( ), and SHSetFolderPathEx( ).

The SHGetFolderLocationEx( ) API subsumes the SHGetFolderlocation( ) API and may provide a caller with additional ability such as retrieving the Knownfolder PIDL for the specified KnownFolderID and/or the ability to specify to create the Knownfolder requested, if it does not already exist. The SHGetFolderLocationEX( ) API 1400 is shown in FIG. 14. The SHGetFolderLocationEX( ) API 1400 parameters may include rfid parameter 1401. The rfid parameter 1401 may represent a GUID identity for the known folder. The dwFlags parameter 1402 may specify special options to be performed when the folder is referenced. The default value for the dwFlag parameter 1402 may be zero. Other exemplary values for dwFlag parameters 1402 are shown in Table 1 below:

TABLE 1

| dwFlag values | Comments |
| --- | --- |
| KF_FLAG_CREATE | When flag is specified, API will try to create the folder when the folder does not exist. |
| KF_FLAG_DONT_VERIFY | When flag is specified, API will not verify that the folder path is stored. |
| KF_FLAG_NO_ALIAS | When flag is specified, API will not try to map the aliased PIDL. |
| KF_FLAG_PER_USER_INIT | Specifies that the per-user initialization should run. |

The hToken parameter 1403 may specify the owner of the per-user known folder. Some of the known folders, for example, the "My Documents" folder, are per-user folders. Every user may have a different path for their "My Documents" folder. If hToken parameter 1403 has a value of NULL, the API may try to access the current user (the caller)'s instance of the folder. If hToken parameter 1403 has a valid user token, the API will try to impersonate the user using this token and try to access that user's instance. Moreover, if the hToken parameter 1403 has a value of −1, then the API may try to access the default user's folder. The ppidl parameter 1404 may return the PIDL of the requested known folder.

The SHGetFolderPathEx( ) API subsumes the SHGetFolderPath( ) API and may provide a caller with the actual file system path of the known folder. The SHGetFolderPathEx( ) API 1500 is shown in FIG. 15. The SHGetFolderPathEx( ) API 1500 parameters may include similar parameters as discussed above with the SHGetFolderLocationEx( ) API 1400 such as rfid parameter 1401, dwFlags parameter 1402, and hToken parameter 1403. In addition, the SHGetFolderPathEx( ) API 1500 may also include a pszPath parameter 1508 and a cchPath parameter 1509. The pszPath parameter 1508 may return the path of a known folder whereas; the cchPath parameter 1509 may specify the buffer size of psz- Path parameter 1508. In addition, the SHGetFolderPathEx( ) API 1500 may have additional dwFlag values available to use as shown in Table 2 below:

TABLE 2

| dwFlag values | Comments |
| --- | --- |
| KF_FLAG_DEFAULT_PATH | Some known folders may be redirected to a different location than the default location. If no flag is specified, API will not return the current (redirected) path of the folder. When flag is specified, API will return the original default location of the specified known folder. |
| KF_FLAG_NOT_PARENT_RELATIVE | To be used with KF_FLAG_DEFAULT_PATH to give the "namespace original" default path, that is independent of the current location of it's parent. |
| KF_FLAG_SHARE_PATH | Used to specify a remote share path corresponding to this folder, for example, \\computer\users$\ming\Documents. |

The SHSetFolderPathEx( ) API 1600 subsumes the SHSetFolderPath( ) API and may allow a caller to set the path for a given known folder. The SHSetFolderPathEx( )API 1600 is shown in FIG. 16. The SHSetFolderPathEx( ) API 1600 parameters may include similar parameters as discussed above with the SHGetFolderLocationEx( ) API 1400 such as rfid parameter 1401, dwFlags parameter 1402, and hToken parameter 1403. In addition, the SHSetFolderPathEx( ) API 1600 may also include a pszPath parameter 1608 which may be used to specify a redirected path for a knownfolder. In addition the ShSetFolderPathEx( ) API 1600 may have additional dwFlag values available to use as shown in Table 3 below:

TABLE 3

| dwFlag value | Comments |
| --- | --- |
| KF_FLAG_DONT_UNEXPAND | Add the KF_FLAG_DONT_UNEXPAND value to ensure that the string is written to the registry exactly as provided. If the KF_FLAG_DONT_UNEXPAND flag is not included, portions of the path may be replaced by environment strings, such as %USERPROFILE%. |

As stated above, in another aspect of the invention, the knownfolder functionality may be provided for by Com APIs. The COM interfaces may include an IKnownFolder API, an IKnownFolderManager API, an IEnumKnownFolder interface, and IKnownFolderHandler.

As shown in FIG. 17, the IKnownFolder API 1700 may provide an application the ability to get a GUID value and/or a PIDL value for a defined knownfolder. Moreover, the IKnownFolder API 1700 may get or set the path for the defined knownfolder. The IKnownFolder API parameters may include a GetID( ) parameter 1701. The GetID( ) parameter 1701 may obtain the GUID for a specified knownfolder. The GetCategory( ) parameter 1702 may retrieve a knownfolder category for a specified knownfolder. The knownfolder categories may include a virtual folder category, a fixed-file system category, a common folder category, and/or a per-user folder category.

Additional parameters of the IKnownFolder API 1700 may include a GetPath( ) parameter 1703, a SetPath( ) parameter 1704, a GetLocation( ) parameter 1705, and a GetItem( ) parameter 1706. The GetPath( ) parameter 1703 may obtain the path for a given knownfolder. The SethPath( ) parameter 1704 may set a path for a knownfolder. The GetLocation( ) parameter 1705 may provide a PIDL associated with a knownfolder, whereas, the GetItem( ) parameter 1706 may retrieve Shell interfaces associated with a specified folder.

In addition, redirection may be provided by the IKnownFolder API 1700. Redirection may be specified through the use of an IsRedirectable( ) parameter 1707, IsValidFolderPath( ) parameter 1708, Redirect( ) parameter 1709, and RedirectWithUI( ) parameter 1710. The IsRedirectable( ) parameter 1707 may be provided to check to see if the specified known folder is allowed to be redirected. The IsValidFolderPath( ) parameter 1708 may verify if the provided path is a valid path for redirection. The Redirect( ) parameter 1709 may redirect the specified knownfolder to the specified path. The RedirectWithUI( ) parameter 1710 may show an user interface while redirecting the knownfolder to the specified path.

In another aspect of the invention, an IKnownFolderManager API may be provided. As shown in FIG. 18, the IKnownFolderManager API 1800 may provide the ability to create or delete a knownfolder. The IKnownFolderManager API 1800 may also manage the definitions of a knownfolder such as descriptions of a knownfolder, category of the knownfolder, ownership information of the knownfolder, and/or relative path of a knownfolder. Moreover, the IKnownFolderManager API 1800 may also provide the ability to enumerate all knownfolders available on a computing system or on a computing system environment. For example, the IKnownFolderManager API 1800 may enumerate all of the well knownfolders available to a user having access to a computer network.

According to an aspect of the invention, the IKnownFolderManager API 1800 may include a number of parameters.

For instance, the IKnownFolderManager API 1800 may include a FolderIdFromCSIDL( ) parameter 1801. The FolderIdFromCSIDL( ) parameter 1801 may be used to retrieve the KnownFolder_ID associated with a specified CSIDL.

The FolderIdFromCSIDL( ) parameter 1801 may therefore provide a translation between the CSIDL and the KnownFolder_ID. Similarly, a FolderIdToCSIDL( ) parameter 1802 may also be defined to obtain a CSIDL value for a specified KnownFolder_ID.

A GetFolder( ) parameter 1803 may also be defined as a parameter of the IKnownFolderManager API 1800. The GetFolder( ) parameter 1803 may be utilized to obtain information for a particular knownfolder directly where the ID of the knownfolder is available. The GetFolder( ) parameter 1803 may return a IKnownFolder pointer in order to obtain information such as a GUID value for a knownfolder, a knownfolder category, a knownfolder path, and/or PIDL associated with the knownfolder. Similar to the GetFolder( ) parameter 1803, a GetFolderForUser( ) parameter 1804 may also be defined that provides a caller with the ability to get paths for a knownfolder belonging to a specific user.

Referring to FIG. 18, a GetFolderDefinition( ) parameter 1805 may be provided in order to obtain all properties associated with a specified KnownFolder_ID. According to an aspect of the invention, a KnownFolder_Definition structure 1900 may be defined as shown in FIG. 19. The KnownFolder_Definition structure 1900 may contain a number of defined fields as illustrated in FIG. 19 and as further described in Table 4. These fields may include category 1910, pszName 1911, pszCreator 1912, pszDescription 1913, pfidparent 1914, pszRelativePath 1915, pszParsingName 1916, pszTooltip 1917, pszLocalizedName 1918, pszIcon 1919, pszSecurity 1920, dwAttributes 1921, pszLegacyPath 1922, clsidHandler 1923, and kfdFlags 1924.

TABLE 4

| Fields | Description |
| --- | --- |
| category | Denotes which knownfolder category the specified folder may belong to. |
| pszName | Provides a non-localized name for the known folder. |
| pszCreator | The application name which defines the known folder. |
| pszDescription | A short description of what the knownfolder represents. |
| pfidParent & pszRelativePath | May be utilized with common and per-user folders to indicate that a particular knownfolder should be created under another knownfolder. |
| pszParsingName | This field may be utilized for virtual folders to indicate the Shell namespace folder path. |
| pszTooltip | The field may represent a default tool tip used for a knownfolder when the folder is created by the API. |
| pszLocalizedName | A default localized name used for this knownfolder when the folder is created by the API. |
| pszIcon | A default icon used for a knownfolder when the folder is created by the API. |
| pszSecurity | A SDDL format string to describe the default security descriptor used for this known folder when the folder is created by the API. If null, the security of this knownfolder may be inherited from the parent. |
| dwAttributes | Default file system attributes such as read-only to be set when this folder is created. |

TABLE 4-continued

| Fields | Description |
| --- | --- |
| pszLegacyPath | Provides a legacy path for folders. It may be used in migration/roaming and application compatibility. |
| clsidHandler | May specify an IKnownFolderHandler object which can be invoked to do some customization work in certain events such as creation and deletion of this known folder. |
| dwDefinitionFlags | Defines several flags to describe more subtle behaviors for this knownfolder. These flags may include: KFDF_PERSONALIZE - to display a personalize name for the folder; KFDF_LOCAL_REDIRECT_ONLY - may be redirected to a local disk; KFDF_ROAMABLE - may be roamed via PC to PC sycn. |

Referring to FIG. 18, parameters such as RegisterFolder( ) parameter 1806 and UnregisterFolder( ) parameter 1807 may be provided in order to create or delete a knownfolder for the system. The RegisterFolder( ) parameter 1806 may require a user or caller to specify a valid KnownFolder_Definition. The UnregisterFolder( ) parameter 1808 may delete the KnownFolder_Definition definition when requested.

Additional parameters such as the GetEnumKnownFolders( ) parameter 1809 and GetEnumKnownFoldersForUser( ) parameter 1810 may also be defined for use with the IKnownFolderManager API 1800. The GetEnumKnownFolders( ) parameter 1809 may return a pointer to enumerate all knownfolders on a system whereas, the GetEnumKnownFoldersForUser( ) parameter 1810 may provide a caller with the ability to enumerate knownfolders for a specific user. Finally, a FindFolderFromPath( ) parameter 1811 may return a known folder pointer to obtain an associated known folder ID for the file system path provided.

In another aspect of the invention, an IEnumKnownFolder( ) API may be provided. As shown in FIG. 20, the IEnumKnownFolder( ) API 2000 may provide the ability to enumerate knownfolders. The GetEnumKnownFolders( ) parameter 1809 and GetEnumKnownFoldersForUser( ) parameter 1810 may return a pointer to the IEnumKnownFolder( ) API 2000 to get an enumeration of all knownfolders on the system. The IEnumKnownFolder( ) API 2000 may include parameters such as Next( ) 2001, Skip( ) 2002, Reset( ) 2003, and Clone( ) 2004. The Next( ) parameter 2001 may retrieve a specified number of item identifiers in the enumeration sequence and advance the current position by the number of retrieved items. The Skip( ) parameter 2002 may skip over a specified number of elements in the enumeration sequence. The Reset( ) parameter 2003 may return the interface to the beginning of the enumeration sequence. The Clone( ) parameter 2004 may create a new enumeration object with the same contents and state as the current one.

In another aspect of the invention, an IKnownFolderHandler( ) API may be provided. As shown in FIG. 21, the IKnownFolderHandler( ) API 2100 may provide the ability for other components to add special code for the creation and/or deletion of a knownfolder. The IKnownFolderHandler( ) API 2100 may include parameters such as GetDefaultLocation( ) 2101, FolderCreated( ) 2102, and FolderRemoved( ) 2103. The GetDefaultLocation( ) parameter 2101 may retrieve the default location for a knownfolder. The FolderCreated( ) parameter 2102 may initiate a handler when the specificed knownfolder is created. Moreover, a FolderRemoved( ) parameter 2103 may initiate the handler when the specified knownfolder is deleted. This may provide the ability for an application to run custom code when a known folder created by the application is created or deleted.

Figure 22:
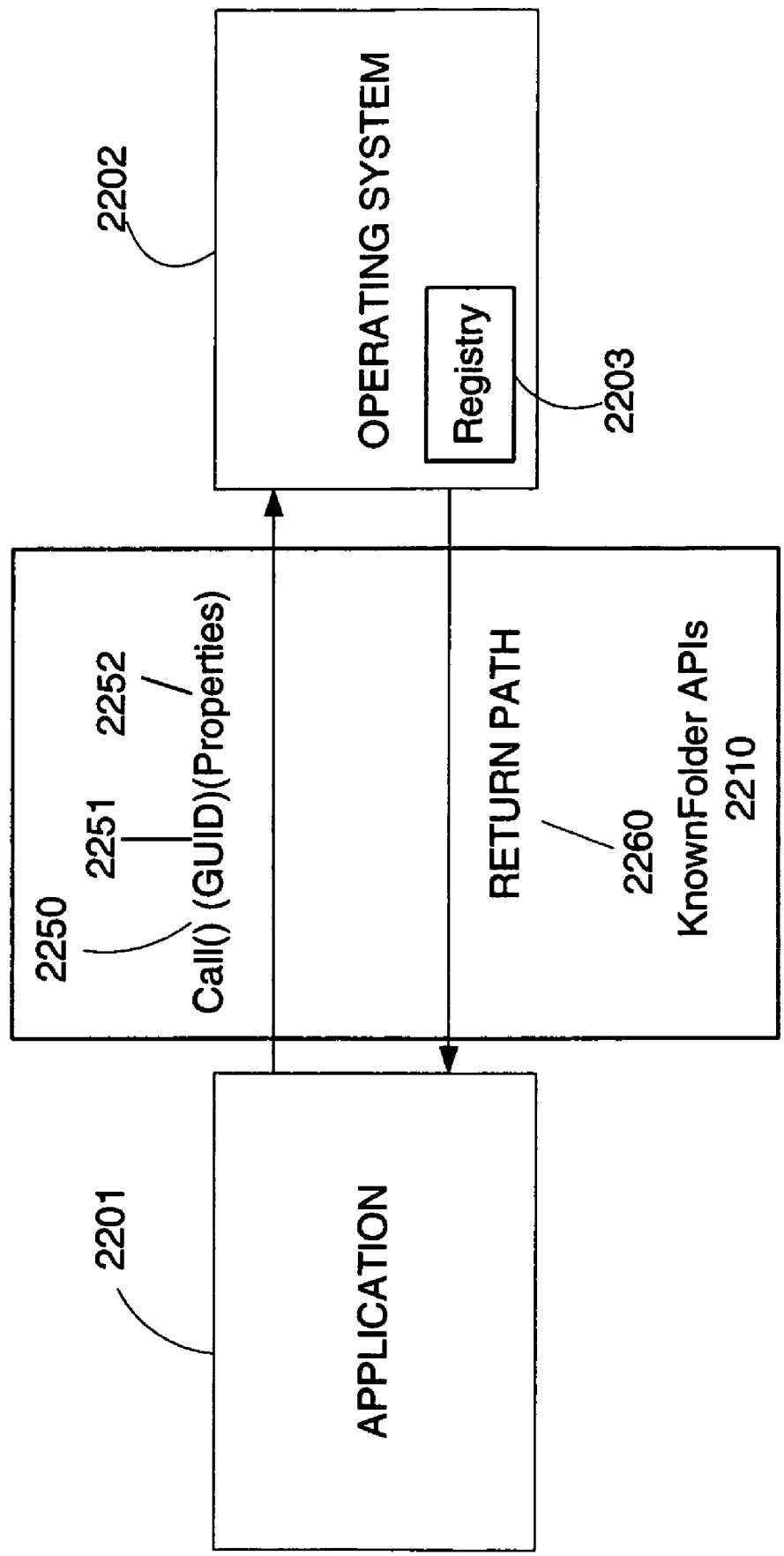
FIG. 22 illustrates a requesting component utilizing a program interface call to an operating system in accordance with an aspect of the invention.

FIG. 22 illustrates a requesting component 2201 utilizing a program interface call to an operating system 2202 in accordance with an aspect of the invention. In this aspect of the invention, requesting component 2201 is an application, although with other embodiments, requesting component 2201 may be integrated within peripheral hardware of computer 110 as shown in FIG. 1.

Requesting component 2201, upon installation by a developer or user, may decide to create, enumerate, or manage existing knownfolders on computer 110. For example, an application 2201 of FIG. 22 may create a new folder inside a users profile by adding the new knownfolders directly to registry 2203 when an application is installed. In addition, the new knownfolders may be added through the KnownFolder APIs 2210 such as the IKnownFolderManager API. A developer or user, through the application 2201 may call 2250 an API such as the IKnownFolder Manager API 1800 to create a new knownfolder. The developer or user may through the application provide a GUID 2251, which will be the unique identifier for the new knownfolder. The developer or user may also define additional properties 2252 over and beyond the standard properties that will be associated with the new knownfolder. Referring to FIG. 22, application 2201 transmits a call 2250 such as a call to KnownFolder APIs 2210. In response to input 2250, the IKnownFolderManager API 1800 registers with the operating system 2202 the new knownfolder with registry 2203 of operating system 2202. The operating system, in response, may transmit a path 2260 of the new knownfolder to the application 2201.

Figure 22A:
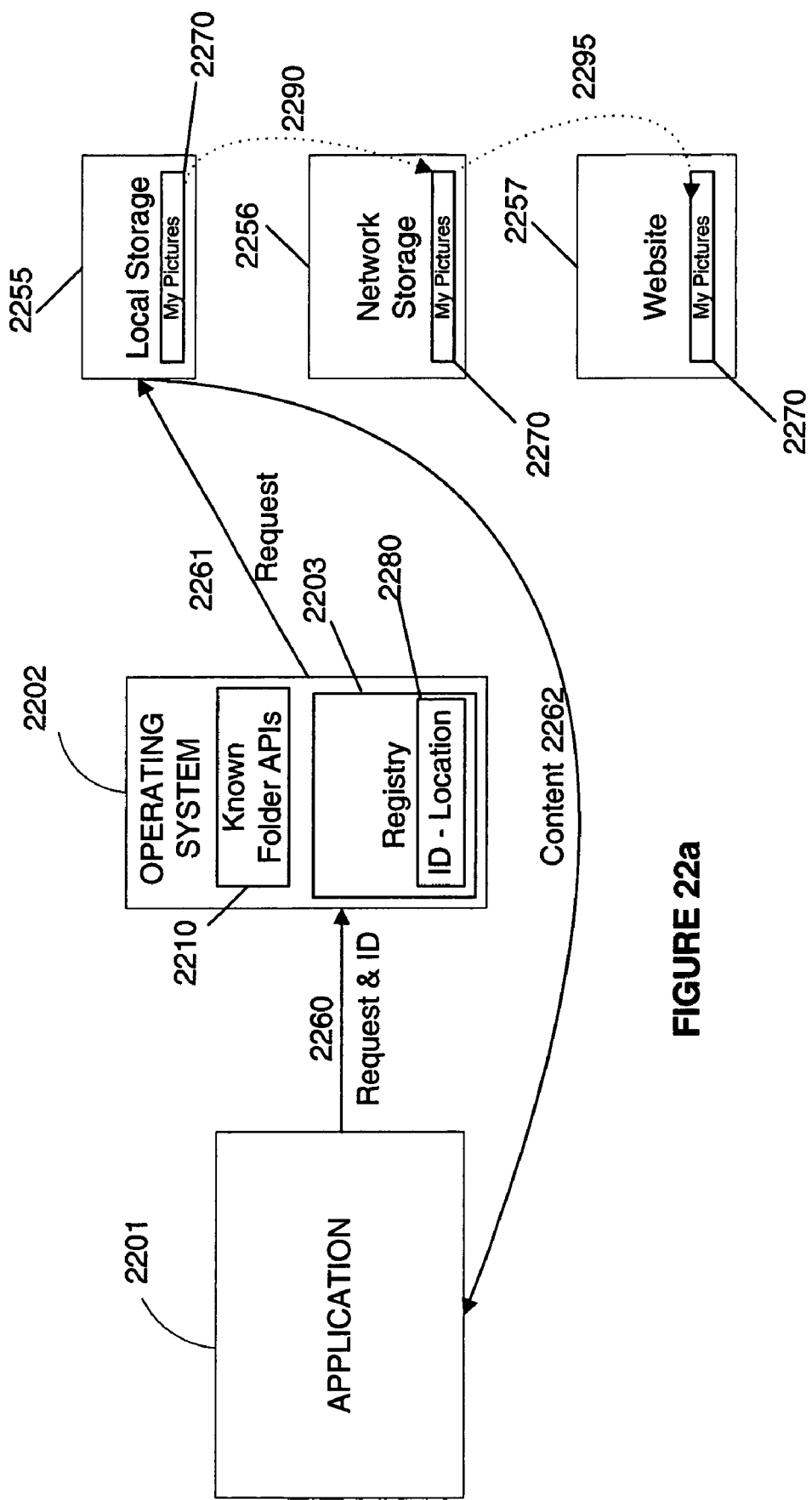
FIG. 22a illustrates another aspect of the invention wherein an application transmits a request along with a identification of a known folder to determine the location of a known folder in accordance with an aspect of the invention.

FIG. 22a illustrates another aspect of the invention. Referring to FIG. 22a, an application 2201 utilizing a program interface call may transmit a request along with identification 2260 for the location of a known folder via the known folder APIs 2210. The known folder APIs 2210 may search a registry 2203 for a listing 2280 of known folder IDs along with their corresponding storage locations. Known folder APIs 2210 may verify that the storage location specified in the registry is valid, via a request 2261 to a particular storage device such as local storage 2255 wherein the known folder may be located. Upon verifying the location, the KnownfolderAPI may return the path of the requested Known Folder back to the application. For example, the My Pictures 2270 known folder may be requested by application 2201 via call 2260. Known folder APIs 2210 may determine the location of the Pictures 2270 known folder through examination of registry listing 2280. The known folder APIs 2210 may verify that the location does exist via a request 2261 to local storage 2255 and on confirmation may return the path to the Pictures location 2262 on the local storage 2255 to the application 2201.

The My Pictures known folder 2270 may be moved 2290 from local storage 2255 to Network Storage 2256. The relocation of the My Pictures known folder 2270 changes the location path for the My Pictures known folder 2270. The location of the My Pictures known folder 2270 may be updated in registry 2203. Similarly, the movement 2295 of the My Pictures known folder 2270 to another location such as a website location 2257 may also initiate the updating of registry 2203 with the new location of the My Pictures known folder 2270.

Figure 23:
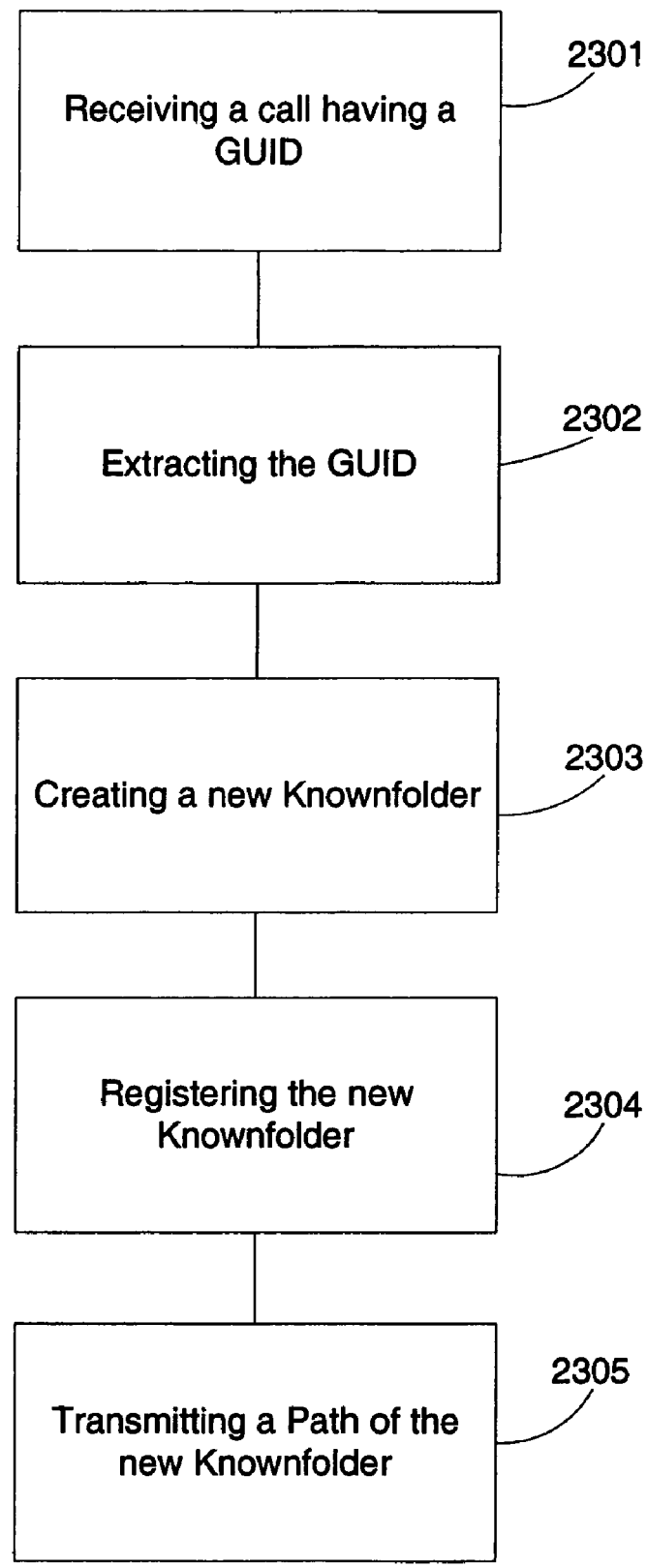
FIG. 23 illustrates a method of creating a new knownfolder in accordance with an aspect of the invention.

FIG. 23 illustrates a method of creating a new knownfolder in accordance with an aspect of the invention. Referring to FIG. 23, a component such as an operating system may receive at step 2301 a call having a GUID from a first component. The first component may include an application program being installed or initialized by a developer or user. Upon receipt of the call by the operating system, the operating system may at step 2302 extract a GUID provided by the application program. The call may also include additional information such as properties for use in the creation of the new knownfolder. The properties may include information to define the new knownfolders such as a category, a pszName, a pszCreator, a pszDescription, a pfidParent, a pszRelativePath, a pszParsingName, a pszTooltip, a pszLocalizedName, a pszIcon, a pszSecurity, a dwAttributes, a pszLegacyPath, a clsidhandler, and a kdfFlags.

Based on the extracted GUID and additional information provided, a new knownfolder at step 2303 may be created. The new knownfolder may be included in the registry of the operating system as indicated in step 2304. The operation system in step 2405 may transmit a path of the new knownfolder to the application program. The application program may enumerate all of the existing knownfolders on the local or network system.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. One or more computer storage media having computer-executable instructions embodied thereon that, when executed by a processor, perform a method of communication between a first component and a second component accommodated on computing device(s), the method comprising:
   receiving a call from the first component requesting a location of a known folder, the call including an identification of the known folder, wherein the identification comprises ordinal values that provide system-independent indicia of the location of the known folder, and wherein the known folder includes an object that facilitates running an application known to an operating system by way of a hierarchical file structure;
   based on the identification, providing an identity parameter that represents a unique identifier of the known folder within the hierarchical file structure;
   searching a registry for the location of the known folder by examining the unique identifier against known folder IDs corresponding to storage locations;
   determining an appropriate known folder that corresponds to a storage location of the storage locations that satisfies the search of the registry;
   verifying that the storage location is valid by locating the appropriate known folder associated with the storage location within the hierarchical file structure on a storage device;
   accessing data from the appropriate known folder at the storage location; and
   adding to the appropriate known folder a new property that informs at least one of developers and users of usage by the first component of the appropriate known folder.

2. The one or more computer storage media of claim 1, wherein the storage location comprises a local hard drive.

3. The one or more computer storage media of claim 1, wherein the storage location comprises a network drive.

4. The one or more computer storage media of claim 1, wherein the storage location comprises a website.

5. The one or more computer storage media of claim 1, further comprising:
   determining that no storage location in the registry corresponds to the identification in the call;
   creating a new known folder and providing a location of the new known folder to the second component.

6. The one or more computer storage media of claim 1, wherein the identification includes a CSIDL value of the known folder.

7. The one or more computer storage media of claim 1, further comprising:
   recognizing that the appropriate known folder is relocated from the corresponding storage location on the storage device to a new location in a network;
   updating the storage location of the appropriate known folder to the new location within the registry; and
   accessing data from the appropriate known folder at the new location.

8. One or more computer storage media having computer-executable instructions embodied thereon that, when executed by a processor, perform a method of communication between an application and an operating system accommodated on computing device(s), the method comprising:
   recognizing the application is initialized on the operating system;
   incident to initialization, receiving a call at the operating system having a globally unique identifier (GUID) from the application, wherein the GUID includes system-independent ordinal values for identifying a new known folder;
   extracting the GUID from the call;
   requesting the application to specify a relative location of the new known folder and to set a parameter that establishes a category of the new known folder, wherein the new known folder belongs to a category that comprises at least one of a virtual folder that appears in a hierarchical file structure without actual file system folders associated therewith, a fixed-file system having file system folders whose location is fixed upon installation of the operating system, a common folder having file system folders that are used for sharing data and settings between user, and a per-user folder having file system folder that are located in an individual's profile and owned by the individual;
   automatically creating a new known folder based on the extracted GUID, wherein the new known folder includes a custom property that informs at least one of developers and users of usage of the new known folder by the application, and wherein the new known folder is created in the relative location on the hierarchical file structure;
   registering the new known folder within a registry; and
   enumerating a listing of known folders that are accessible to the operating system, wherein enumerating includes transmitting a path of the new known folder to the application, and wherein the path indicates the relative location where the new known folder is created.

9. The one or more computer storage media of claim 8, wherein the call further includes properties for use in the creation of the new known folder.

10. The one or more computer storage media of claim 9, wherein the properties of the new known folder are selected from the group consisting of a category, a pszName, a pszCreator, a pszDescription, a pfidParent, a pszRelativePath, a pszParsingName, a pszTooltip, a pszLocalizedName, a pszIcon, a pszSecurity, dwAttributes, a pszLegacyPath, a clsidHandler, and kdfFlags.

11. The one or more computer storage media of claim 8, further comprising:
   receiving a call querying category type of a specified known folder.

12. The one or more computer storage media of claim 8, further comprising:
   receiving a request for the enumeration of all known folders.

13. The one or more computer storage media of claim 8, wherein the operating system stores a set of application programming interfaces (APIs).

14. The one or more computer storage media of claim 13, wherein the set of application programming interfaces are selected from the group consisting of an IKnownFolder, an IKnownFolderManager, an IEnumKnownFolder interface, and an IKnownFolderHandler.

15. The one or more computer storage media of claim 13, wherein the set of application programming interfaces are selected from the group consisting of SHGetFolderLocationEx( ), SHGetFolderPathEx( ), and SHSetFolderPath Ex( ).

16. One or more computer storage media having computer-executable instructions embodied thereon that, when executed by a processor, perform a method of communication between an application and an operating system accommodated on computing device(s), the method comprising:
   receiving a call from the application including an identification of a folder and a token parameter that specifies an owner of the folder and includes a valid user token, wherein the identification comprises ordinal values that provide system-independent indicia of the location of the known folder, and wherein the folder includes an object that facilitates running the application known to the operating system by way of a hierarchical namespace structure, wherein an identity of the folder has been made known to the hierarchical namespace structure of the operating system and a plurality of application programs;
   searching a registry for the location of the folder, wherein the location of the folder has been made known to a hierarchical namespace structure of the operating system and the plurality of application programs;
   determining a location of the folder within the hierarchical namespace structure;
   accessing data from the folder at the determined location, wherein accessing comprises:
   (a) impersonating the owner of the folder by specifying the valid user token; and
   (b) accessing an owner's instance of the folder; and
   adding to the folder a new property that informs at least one of developers and users of usage by the application of the folder.

17. The one or more computer storage media of claim 16, wherein the determined location comprises a local hard drive.

18. The one or more computer storage media of claim 16, wherein the determined location comprises a network drive.

19. The one or more computer storage media of claim 16, wherein the determined location comprises a website.

20. The one or more computer storage media of claim 16, further comprising creating a new folder, which has been made known to an operating system shell and a plurality of application programs, if the received folder identification is not valid and providing a location of the new folder, which has been made known to an operating system shell and a plurality of application programs, to the second component.

* * * * *